United States Patent Office 2,924,575
Patented Feb. 9, 1960

2,924,575

XENYL TRIPHENOXY SILANE, MIXTURES THEREOF AND METHOD OF TRANSFERRING HEAT

Herbert C. Kaufman, New Haven, Conn., assignor to John B. Pierce Foundation, New York, N.Y., a corporation of New York No Drawing. Application October 16, 1956
Serial No. 616,125

10 Claims. (Cl. 252—78)

This invention relates to a fluid medium adapted to be used in the transfer of heat, as a lubricant, and as a hydraulic fluid. It relates in particular to liquid organosilicon compounds.

The criteria for a heat transfer medium includes low starting viscosity, which has a practical bearing on its value as a heat transfer medium; high boiling point, which enables the material to be used at the high temperatures which are required for many of the present day industrial needs; and thermal stability, which permits the use of the material over a long period of time and at elevated temperatures.

Liquid heat transfer media which have the desired combination of properties of chemical stability at high temperature and fluidity at low temperature have long been sought. The Johnson U.S. Patent No. 2,335,012 discloses as a heat transfer medium mixtures of tetra aryl orthosilicates. The Morgan et al. U.S. Patent No. 2,674,579 discloses mixtures of certain phenyl aryloxy silanes prepared by the reaction of phenyltrichlorosilane with an equimolecular mixture of phenol and cresol. All of these compounds, however, suffer the disadvantage of having a high viscosity after prolonged heating at high temperature, probably caused by decomposition and polymerization.

In my co-pending patent application Serial No. 569,249 which was filed March 5, 1956, of which the present application is a continuation-in-part, I describe the compound xenyl triphenoxy silane (in which the position of the silicon atom on the aromatic nucleus is ortho, meta or para, or mixtures of any of them) and its use in the transferring of heat. This material has the rare and desirable property of decreasing in viscosity upon heating. However, it would be desirable to have a material which has a lower initial viscosity than the xenyl triphenoxy silane. Although certain high temperature heat transfer fluids having a low initial viscosity are known at the present time, such liquids increase rapidly in viscosity during use due to polymerization or other causes as heretofore indicated.

Accordingly, it is an object of the present invention to supply a material which has a low initial viscosity and meets the other criteria of a heat transfer fluid so that it may be successfully used in heat transmission, as a lubricant and as a hydraulic fluid.

Other objects and advantages of the invention will appear from the following description.

The product which fulfills other objects and provides advantages of the invention is a mixture of xenyl triphenoxy silane which is described in my copending application Serial No. 569,249 referred to heretofore, and a normally solid (i.e. at 25° C.) organic silicic ester having the following formula $(R')_y$—Si—$(O-R)_x$ where R is an aryl group, or aralkyl group of the formula —$(CH_2)_n$—R″, R′ is hydrogen, aryl, or aralkyl of the formula —$(CH_2)_n$—R″, $n$ is 1 or 2, R″ is an aryl group, $x$ is 1 to 4, $y$ is 0 to 3, and the sum of $x$ and $y$ is 4. Preferably, R, R′ and R″ are aryl group in which the sole aromatic nucleus is the benzene ring. Some examples of these organic silicic esters are triphenyl phenoxy silane, diphenyl diphenoxy silane, phenyl triphenoxy silane, triphenoxy silane, and tetra phenoxy silane (tetraphenyl orthosilicate). The phenyl groups of the compounds just referred to may also be substituted entirely or in part by other aryl or aralkyl groups such as cresyl xylenyl, benzyl, p-phenoxy phenyl, etc. Another compound which produces liquid mixtures with the xenyl triphenoxy silane having lower viscosity than the latter compound alone is hexaphenoxy disilyl ethane $$[(C_6H_5O)_3 \cdot Si \cdot CH_2 \cdot CH_2 \cdot Si \cdot (C_6H_5O)_3]$$

The invention provides mixtures which unexpectedly have a lower initial viscosity than the liquid xenyl triphenoxy silane, by adding a solid to such liquid. Moreover, in most instances, the mixtures retain the characteristic decrease in viscosity on heating of the xenyl triphenoxy silane.

In order to preserve the fluidity of mixtures and prevent crystallization or solidification at ordinary temperatures, the amount of xenyl triphenoxy silane in the mixture is maintained at least 50 mol percent based on the mixture thereof with the normally solid silicic ester and in the case of some of the mixtures of the invention, somewhat larger amounts of xenyl triphenoxy silane may be required in order to prevent crystallization. Still larger amounts of the xenyl triphenoxy silane of course may be used, but in order to effect a significant decrease in initial viscosity and also for economical reasons it is preferred to add at least 10 mol percent of the organic silicic ester to the mixture, i.e., to limit the amount of xenyl triphenoxy silane to not greater than 90 mol percent. The mixtures of the invention may be prepared by either of two methods designated herein as method "A" and method "B."

According to method "A," a physical mixture of the liquid xenyl triphenoxy silane and the solid silicic ester is prepared and heated for about twenty-four hours at a temperature above 300° C. A vacuum is preferably applied to the mixture after this heating process whereby any low boiling impurities will be removed.

The preferred method ("B") of preparing the mixture is to react a mixture of xenyl trichlorosilane and the chlorosilane corresponding with the particular organic silicic ester to be used, with a stoichiometric phenol or alcohol having the aryl or aralkyl group that is to be introduced to the components of the mixture. This process may be carried out by the method described in my copending application Serial No. 569,249. Hydrogen chloride is liberated, and the mixture is refluxed and thence stripped of low boilers while it is heated under vacuum.

The following examples illustrate methods for preparing the mixtures of the invention and show the superiority of such mixtures over other known heat transfer liquids.

EXAMPLE I 376 grams (4.0 mols) of phenol were melted and poured into a round-bottomed flask equipped with a dry ice-cooled reflux condenser leading to a fume hood. The flask was also equipped with a paddle-type motor-driven stirrer and a dropping funnel fitted with a calcium chloride drying tube. 143 grams (0.5 mol) of xenyl trichlorosilane were melted at 45° C. and added to 85 grams (0.50 mol) of silicon tetrachloride at 20° C. The resulting mixture was poured into the dropping funnel and thence added slowly to the well-stirred phenol. An endothermic reaction ensued with the liberation of hydrogen chloride. After all the chlorosilanes had been added, heat was applied slowly to the bottom of the round-bottomed flask so as not to lose any silicon tetrachloride, which boils at 57.6° C. Temperature was gradually increased to the refluxing temperature of 230° C. and was maintained at this level for twenty-four hours to insure the removal of all of the hydrogen chloride. The flask was then cooled to 240° C. and vacuum was applied, thereby to remove low boiling materials such as excess phenol. The pressure was maintained at about 0.5 mm. of mercury and the head temperature was kept below 195° C. during this stripping process. After stripping, the residue was cooled to 100° C. and filtered through dry "Celite" (an inert diatomaceous silica filter-aid). The filtrate was a clear brown liquid. The product, which was an equimolecular mixture of xenyl triphenoxy silane and tetraphenoxy silane, had a viscosity at 77° F. measured by the Fenske method of 77.9 centistokes. Its boiling point was 820° F. The yield was 94%. The mixture showed no sign of crystallization after having been maintained at 37° F. for three months.

EXAMPLE II

Method "A" for the preparation of the mixtures of the invention was carried out by mixing 230 grams (0.50 mol) of xenyl triphenoxy silane and 200 grams (0.50 mol) of melted tetraphenoxy silane. The mixture was heated for twenty-four hours at 300° C. and was then cooled and stripped of any low boiling impurities by heating it under a vacuum of 0.5 mm. of mercury absolute pressure and a head temperature of 195° C. The residue was cooled to about 100° C. and filtered through dry "Celite" as in Example I. The clear, brown-colored liquid product had a boiling point of 820° F. and a viscosity at 77° F. of 75.0 cs.

EXAMPLE III

Following the procedure described in Example I, in which method "B" was used to prepare the mixture of the invention, a mixture of 171 grams (0.6 mol) of xenyl trichlorosilane and 85 grams (0.4 mol) of phenyltrichlorosilane was added slowly to 329 grams (3.5 mols) of melted phenol. The elimination of hydrogen chloride ensued. The mixture was refluxed at 250° C. for twenty-four hours, cooled and stripped of low boiling materials under vacuum while maintaining a pot temperature of 250° C., head temperature below 195° C., and a pressure of 0.1 mm. of mercury absolute. The residue was cooled and filtered through dry "Celite" to produce clear, orange-colored liquid, having a viscosity at 77° F. of 94.0 cs. and a boiling point of 820° F. The yield was 96% of a mixture having a 60:40 mol ratio of xenyl triphenoxy silane to phenyl triphenoxy silane. This material showed no sign of crystallization at 37° F.

EXAMPLE IV

A 50:50 mol ratio mixture of phenyl triphenoxy silane (M.P. 48° C.) and xenyl triphenoxy silane was prepared by Method A. The viscosity of the xenyl triphenoxy silane before mixing was 187.0 cs. (at 77° F.). The initial viscosity of the mixture (which was completely liquid at 25° C.) was 94.0 cs. After being heated at 700° F. for 5 days the viscosity of the mixture was 80.0 cs., and 59.2 cs. after 56 days at 700° F.

EXAMPLE V

Comparison viscosity and aging tests were carried out on xenyl triphenoxy silane (test 1), a 50–50 mol ratio mixture of tetraphenoxy silane and xenyl triphenoxy silane (test 2), a 40–60 mol ratio mixture of phenyl triphenoxy silane and xenyl triphenoxy silane (test 3), and a 60–40 mol ratio mixture of phenyl triphenoxy silane and phenyl tricresoxy silane (test 4). The tests were carried out by placing a sample of each liquid in a cylindrical tube having a narrow neck ending in a 2 mm. internal diameter capillary tube. An iron strip was placed in the liquid to simulate industrial conditions in actual heat transfer systems. The tubes were then placed in a fused nitrate-nitrite salt bath maintained at 700° F. Samples of the liquid were taken periodically by removing the tube from the bath, cooling it, and withdrawing a sample for a viscosity measurement at 77° F. The results of the aging and viscosity tests are presented in the following Table 1. The superscripts appearing in the table refer to the number of days of continuous heating at 700° F., while the base numbers are the viscosity measurements in centistokes.

*Table 1*

| Test No. | Molal Ratio | Compound or Mixture | Initial Viscosity, degrees | Viscosity at 25° C. upon Heating at 700° F. | | | | | | | |
|---|---|---|---|---|---|---|---|---|---|---|---|
| 1 | | $\phi\phi Si(O\phi)_3$ | 166 | $107^7$ | $92^{14}$ | $85^{21}$ | $84^{45}$ | $77^{73}$ | $78^{115}$ | $61^{153}$ | $76^{213}$ |
| 2 | ½ ½ | $Si(O\phi)_4$ $\phi\phi Si(O\phi)_3$ | 78 | $62^7$ | $51^{31}$ | $49^{63}$ | | | | | |
| 3 | ⅖ ⅗ | $\phi Si(O\phi)_3$ $\phi\phi Si(O\phi)_3$ | 94 | $80^5$ | $70^{13}$ | $64^{25}$ | $64^{29}$ | $59^{56}$ | $83^{84}$ | $95^{104}$ | $101^{132}$ $110^{163}$ |
| 4 | ⅗ ⅖ | $\phi Si(O\phi)_3$ $\phi Si(O\phi CH_3)_3$ | 55 | $59^4$ | $89^{11}$ | $234^{26}$ | $510^{33}$ | $1,730^{46}$ | | | |

It will be noted from Table 1 that the xenyl triphenoxy silane in test 1 had a high initial viscosity but decreased in viscosity as time progressed during the test, while the mixtures of the invention as in tests 2 and 3 exhibited not only the decrease in viscosity with time, but also the unexpected low initial viscosity. In test 4 a known heat transfer liquid had an initial low viscosity but rapid increase in viscosity was found to occur upon heating.

EXAMPLE VI

A mixture of diphenyl diphenoxy silane (melting point 71° C.) and xenyl triphenoxy silane in the mol ratio of 0.36 to 0.64, respectively, was prepared by method A described above. The viscosity of the pure xenyl triphenoxy silane was 187.0 cs. and the mixture (which was completely liquid at 25° C.) had an initial viscosity of 156.0 cs. After heat treatment at 700° F. for 8 days the viscosity of the mixture was 127.0 cs., and 118.0 cs. after 42 days at 700° F. Completely liquid mixtures (25° C.) can be made containing about 40 mol percent of this solid.

EXAMPLE VII

A mixture of tetra-p-cresyl silicate (melting point 69° C.) and xenyl triphenoxy silane was prepared in the mol ratio of 0.33 to 0.67, respectively, by method A. The viscosity of the pure xenyl triphenoxy silane was 187.0 cs. and the initial viscosity of the mixture (which was completely liquid at 25° C.) was 92.6 cs. After being heated at 700° F. for nine days the viscosity of the mixture was 53.9 cs., and 52.2 cs. after 43 days at 700° F. Completely liquid mixtures (at 25° C.) can be made containing up to 50 mol percent of this solid.

EXAMPLE VIII

A mixture of tetrabenzyl silicate (melting point 32° C.) and xenyl triphenoxy silane was prepared in the mol ratio of 0.40 to 0.60, respectively, by method A. The viscosity of the pure xenyl triphenoxy silane was 187.0 cs. and the viscosity of the freshly prepared mixture (which was completely liquid at 25° C.) was 103 cs. After being heated at 700° F. for 8 days the viscosity of the mixture was 125 cs.

EXAMPLE IX

A mixture of triphenoxy silane (melting point 55° C.) and xenyl triphenoxy silane was prepared by method A in the mol ratio of 0.50 to 0.50. The viscosity of the pure xenyl triphenoxy silane was 187.0 cs. and the initial viscosity of the mixture (which was completely liquid at 25° C.) was 61.8 cs. After having been heated at 700° F. for 7 days the viscosity of the mixture was 40.7 cs., and 36.7 cs. after 42 days at 700° F.

EXAMPLE X

A mixture of triphenyl phenoxy silane (melting point 105° C.) and xenyl triphenoxy silane was prepared in the mol ratio of 0.28 to 0.72, respectively, by method A. The viscosity of the pure xenyl triphenoxy silane was 187.0 cs. and the initial viscosity of the mixture (which was completely liquid at 25° C.) was 176.0 cs. After being heated at 700° F. for 8 days the viscosity of the mixture was 115.0 cs., and 108.0 cs. after heating for 43 days at 700° F. Mixtures which are completely liquid at 25° C. can be made with amounts of triphenyl phenoxy silane as high as 35 mol percent.

EXAMPLE XI

A mixture of tetra-thymyl silicate (melting point 48° C.) and xenyl triphenoxy silane (initial viscosity 187.0 cs.) was prepared in the mol ratio of 30–70 respectively by method A. The initial viscosity of the mixture (which was completely liquid at 25° C.) was 135.0 cs. After being heated at 700° F. for 12 days the viscosity of the mixture was 120.0 cs. Completely liquid mixtures (at 25° C.) can be made containing up to about 40 mol percent of this solid.

EXAMPLE XII

A mixture of hexaphenoxy disilylethane (melting point 88° C.) and xenyl triphenoxy silane (initial viscosity 187.0 cs.) was prepared in the mol ratio of 0.15 to 0.85 respectively. The mixture was prepared by method A. The initial viscosity of the mixture (which was completely liquid at 25° C.) was 80.2 cs. After being heated at 700° F. for 8 days the viscosity of the mixture was 72.6 cs.

Although specific embodiments of the invention have been described herein and in the foregoing examples, it is intended to cover within the scope of the appended claims all modifications and equivalents within the spirit and teaching of the invention. For example, the new heat transfer liquids of the invention may be used advantageously in the transmission of heat as a "transport" fluid, i.e., a fluid may be circulated through a boiler or other heating medium to the location where heat is needed and then returned to the boiler for reheating, whether it be high-grade heat for chemical processing, or low-grade space heat used, e.g., in heating homes or offices.

I claim:

1. A mixture that is completely liquid at ordinary temperatures and is adapted to be used as a hydraulic fluid and in heat transmission, consisting essentially of a mixture of at least 50 mol percent of xenyl triphenoxy silane and the remainder, at least about 10 percent, of a material normally solid at 25° C. of the class consisting of (1) compounds having the structural formula $$(R')_y\text{—Si—}(O\text{—R})_x$$

where R is of the class consisting of aralkyl groups of the formula $\text{—}(CH_2)_n\text{—}R''$ and aryl groups, R' is of the class consisting of aralkyl groups of the formula $\text{—}(CH_2)_n\text{—}R''$, aryl groups and hydrogen, $n$ is 1 to 2, $R''$ is an aryl group, $x$ is 1 to 4, $y$ is 0 to 3, and the sum of $x$ and $y$ is 4, and (2) hexaphenoxy disilylethane.

2. A mixture as described in claim 1 wherein said normally solid material has the structural formula $(R')_y\text{—Si—}(O\text{—R})_x$ wherein R, R', $x$ and $y$ have the values assigned in claim 1.

3. A mixture as described in claim 1 wherein said normally solid material is hexaphenoxy disilylethane in an amount not exceeding about 15 mol percent of the mixture.

4. A mixture as described in claim 2 wherein R, R' and R'' are aryl groups in which the sole aromatic nucleus is the benzene ring.

5. A mixture as described in claim 2 wherein R and R' are phenyl groups.

6. A mixture as described in claim 4 wherein $x$ is 4, $y$ is zero and R is the cresyl group.

7. A mixture as described in claim 4 wherein $x$ is 3, $y$ is 1, R is the phenyl group, and R' is hydrogen.

8. A mixture as described in claim 5 wherein $x$ is 4 and $y$ is zero.

9. A mixture as described in claim 5 wherein $x$ is 3 and $y$ is 1.

10. In a process for transmitting heat to materials in indirect contact with a heat transfer medium, the step of employing as the heat transfer medium a mixture described in claim 1.

References Cited in the file of this patent

UNITED STATES PATENTS

| | | |
|---|---|---|
| 2,584,334 | Da Fano | Feb. 5, 1952 |
| 2,626,266 | Barry | Jan. 20, 1953 |
| 2,674,579 | Morgan et al. | Apr. 6, 1954 |
| 2,701,803 | Orkin | Feb. 8, 1955 |
| 2,730,532 | Martin | Jan. 10, 1956 |
| 2,800,495 | Haluska | July 23, 1957 |